United States Patent
Xia et al.

(10) Patent No.: US 8,675,471 B2
(45) Date of Patent: Mar. 18, 2014

(54) METHOD FOR CONSTRUCTING SPACE-TIME/SPACE-FREQUENCY CODE, AND TRANSMITTING METHOD AND APPARATUS

(75) Inventors: XiangGen Xia, Shenzhen (CN); Bin Li, Shenzhen (CN); Hui Shen, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 13/096,774

(22) Filed: Apr. 28, 2011

(65) Prior Publication Data

US 2011/0255395 A1 Oct. 20, 2011

Related U.S. Application Data

(63) Continuation of application No. PCT/CN2009/075199, filed on Nov. 28, 2009.

(30) Foreign Application Priority Data

Oct. 28, 2008 (CN) .......................... 2008 1 0225231

(51) Int. Cl.
*H04L 1/02* (2006.01)
*H04L 5/00* (2006.01)
*H04L 1/06* (2006.01)

(52) U.S. Cl.
CPC ............... *H04L 5/0007* (2013.01); *H04L 1/06* (2013.01)
USPC .......................................... 370/208; 375/347

(58) Field of Classification Search
CPC .............................. H04L 5/0007; H04L 1/06
USPC ............ 370/208; 375/347; 708/400, 607, 650
See application file for complete search history.

(56) References Cited

U.S. PATENT DOCUMENTS 5,513,214 A * 4/1996 Gozzo ........................... 375/232
5,924,062 A * 7/1999 Maung .......................... 704/219

(Continued)

FOREIGN PATENT DOCUMENTS

| CN | 1901434 A | 1/2007 |
| CN | 1973471 A | 5/2007 |

(Continued)

OTHER PUBLICATIONS

English-language International Search Report and Written Opinion of the International Searching Authority issued in International Application No. PCT/CN2009/075199, mailed Mar. 11, 2010 (9 pages).

(Continued)

*Primary Examiner* — Phuongchau B Nguyen
(74) *Attorney, Agent, or Firm* — Leydig, Voit & Mayer, Ltd.

(57) ABSTRACT

A method for constructing a space-time/space-frequency code, and a transmitting method and apparatus are provided, which relate to the field of wireless communication technologies. The method for constructing a space-time/space-frequency code includes: classifying at least two transmitter antennas into K groups, and classifying information symbols into K' groups; constructing a Toeplitz matrix for information symbols in each group according to the number of transmitter antennas in a transmitter antenna group; and substituting the Toeplitz matrix for nonzero elements in an Orthogonal Space-Time Block Coding (OSTBC) matrix that is based on K and K', and when the OSTBC matrix comprises a zero element, substituting a zero matrix with a corresponding dimension, for the zero element. The space-time code constructed with the above method has orthogonality.

6 Claims, 3 Drawing Sheets

(56) References Cited

U.S. PATENT DOCUMENTS

| | | | |
|---|---|---|---|
| 2008/0130769 A1* | 6/2008 | Papadopoulos et al. | 375/260 |
| 2008/0182611 A1* | 7/2008 | Han et al. | 455/522 |
| 2009/0003414 A1* | 1/2009 | Yellin | 375/147 |
| 2009/0080566 A1 | 3/2009 | Tong et al. | |
| 2010/0011039 A1* | 1/2010 | Vannucci | 708/400 |
| 2010/0091904 A1* | 4/2010 | Wang et al. | 375/296 |

FOREIGN PATENT DOCUMENTS

| | | |
|---|---|---|
| CN | 101043243 A | 9/2007 |
| CN | 10128677 A | 10/2008 |
| CN | 101286777 A | 10/2008 |
| WO | WO 2007/094786 A1 | 8/2007 |

OTHER PUBLICATIONS

Search Report in corresponding Chinese Patent Application No. 200810225231.7 (Nov. 23, 2012).

Shang et al., "A Criterion and Design for Space-Time Block Codes Achieving Full Diversity With Linear Receivers," Jun. 2007, IEEE, New York, New York.

Zhang et al., "Linear Toeplitz Space Time Block Codes," ISIT Proceedings, 2005, IEEE, New York, New York.

* cited by examiner

METHOD FOR CONSTRUCTING SPACE-TIME/SPACE-FREQUENCY CODE, AND TRANSMITTING METHOD AND APPARATUS

CROSS-REFERENCE TO RELATED APPLICATIONS

This application is a continuation of International Application No. PCT/CN2009/075199, filed on Nov. 28, 2009. which claims priority to Chinese Patent Application No. 200810225231.7. filed on Oct. 28, 2008. both of which are hereby incorporated by reference in their entireties.

FIELD OF THE INVENTION

The present invention relates to the field of wireless communication technologies, and in particular, to a method for constructing a space-time/space-frequency code, a transmitting method, a transmitting apparatus, a base station, and a mobile terminal.

BACKGROUND OF THE INVENTION

Spectrum utilization ratio in a mobile communication system can be improved by using space-time/space-frequency codes. In the space-time/space-frequency code technology, Orthogonal Space-Time Block Coding (OSTBC), Toeplitz Space-Time codes, and Overlapped Alamouti codes (OACs) not only can make a receiver simpler, but also can enable a linear transmitter to obtain diversity gain without knowing channel information. The OSTBC includes STBC based on transmission diversity.

The inventor finds that, in the prior art, although a full diversity can be obtained in the case of a linear receiver by using the Toeplitz Space-Time codes and OACs, simulation results for the Toeplitz Space-Time codes and OACs prove that: The performance for using the Toeplitz Space-Time codes and OACs is poor in the case of the same spectrum utilization ratio.

SUMMARY OF THE INVENTION

Embodiments of the present invention provide a method for constructing a space-time/space-frequency code, a transmitting method, and a transmitting apparatus, which not only can obtain a full diversity in the case of a linear receiver, but also can meliorate the bit error rate (BER) and achieve a better compromise between the performance and code rate.

An embodiment of the present invention provides a method for constructing a space-time/space-frequency code, including: at least two transmitter antennas classified into K groups, and information symbols classified into K' groups, where the method includes:
  constructing a Toeplitz matrix for information symbols in each group according to the number of transmitter antennas in a transmitter antenna group; and
  substituting the Toeplitz matrix for nonzero elements in an OSTBC matrix that is based on K and K', and when the OSTBC matrix includes a zero element, substituting a zero matrix with a corresponding dimension, for the zero element.

An embodiment of the present invention provides a transmitting method based on a space-time/space-frequency code, where the method includes:
  obtaining information symbols to be transmitted; and
  transmitting the information symbols according to a space-time/space-frequency code matrix;
  where the space-time/space-frequency code matrix may be divided into at least two sub matrixes, the at least two sub matrixes includes at least two Toeplitz matrixes, or includes Toeplitz matrixes and at least one zero matrix, the Toeplitz matrixes are corresponding to nonzero elements in a given OSTBC matrix respectively, and when the OSTBC matrix includes a zero element, the zero matrix is corresponding to the zero element in the OSTBC matrix.

An embodiment of the present invention provides a transmitting apparatus, where the apparatus includes:
  an obtaining module, configured to obtain information symbols to be transmitted; and
  a transmitting module, configured to transmit, according to a space-time/space-frequency code matrix, the information symbols that are to be transmitted and are obtained by the obtaining module, where the space-time/space-frequency code matrix may be divided into at least two sub matrixes, the at least two sub matrixes includes: at least two Toeplitz matrixes, or includes Toeplitz matrixes and at least one zero matrix, the Toeplitz matrixes are corresponding to nonzero elements in a given OSTBC matrix respectively, and when the OSTBC matrix includes a zero element, the zero matrix is corresponding to the zero element in the OSTBC matrix.

An embodiment of the present invention provides a base station, where the base station includes:
  an obtaining module, configured to obtain information symbols to be transmitted; and
  a transmitting module, configured to transmit, according to a space-time/space-frequency code matrix, the information symbols that are to be transmitted and are obtained by the obtaining module, where the space-time/space-frequency code matrix may be divided into at least two sub matrixes, the at least two sub matrixes includes: at least two Toeplitz matrixes, or includes Toeplitz matrixes and at least one zero matrix, the Toeplitz matrixes are corresponding to nonzero elements in a given OSTBC matrix respectively, and when the OSTBC matrix includes a zero element, the zero matrix is corresponding to the zero element in the OSTBC matrix.

An embodiment of the present invention provides a mobile terminal, where the mobile terminal includes:
  an obtaining module, configured to obtain information symbols to be transmitted; and
  a transmitting module, configured to transmit, according to a space-time/space-frequency code matrix, the information symbols that are to be transmitted and are obtained by the obtaining module, where the space-time/space-frequency code matrix may be divided into at least two sub matrixes, the at least two sub matrixes includes: at least two Toeplitz matrixes, or includes Toeplitz matrixes and at least one zero matrix, the Toeplitz matrixes are corresponding to nonzero elements in a given OSTBC matrix respectively, and when the OSTBC matrix includes a zero element, the zero matrix is corresponding to the zero element in the OSTBC matrix.

According to the description about the technical solution, in embodiments of the present invention, Toeplitz matrixes are established for information symbols in each group, and a space-time/space-frequency code matrix having orthogonality is constructed by taking the Toeplitz matrixes as elements in an OSTBC matrix and using the process of constructing the OSTBC matrix. The use of the space-time/space-frequency code matrix having the orthogonality according to the embodiments of the present invention not only can obtain a full diversity in the case of a linear receiver, but also can prove through simulation results that, in the case of the same spectrum utilization ratio, with respect to the Toeplitz Space-Time codes and OACs, the space-time/space-frequency code matrix having the orthogonality constructed according to the embodiments of the present invention meliorates the bit error rate effectively, and can achieve a better compromise between the performance and code rate.

DETAILED DESCRIPTION OF THE EMBODIMENTS

A specific embodiment of a method for constructing a space-time/space-frequency code according to the present invention is described below with reference to FIG. 1.

Figure 1:
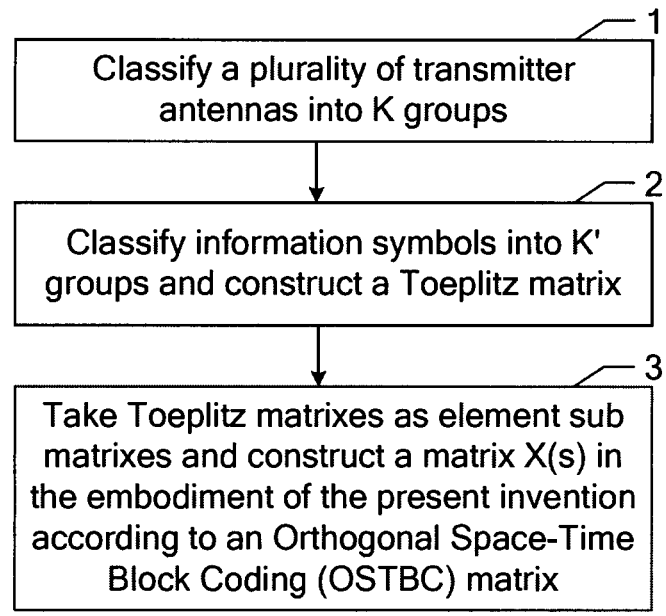
FIG. 1 is a schematic flow chart of a method for constructing a space-time/space-frequency code according to an embodiment of the present invention.

In FIG. 1, in step 1. a plurality of transmitter antennas is classified into K groups. The plurality of transmitter antennas herein may be all transmitter antennas of a transmitting apparatus, or may be part of the transmitter antennas of the transmitting apparatus.

In the process of classifying a plurality of transmitter antennas into K groups, the transmitter antennas may be classified as uniform as possible, that is, the plurality of transmitter antennas can be classified into K groups according to a principle of minimum difference of the number of transmitter antennas between the groups. Certainly, the principle of minimum difference of the number of transmitter antennas between the groups may also be a principle of minor difference of the number of transmitter antennas between the groups.

A specific example for classifying a plurality of transmitter antennas into K groups may be as follows.

The number of transmitter antennas is $N_t$, and $N_t$ transmitter antennas can be classified into K groups as follows:

$$\mathbb{N}_{N_t,K} \triangleq \left\{ \mathcal{N}_{N_t,K} = (n_1, n_2, \ldots, n_K) \mid n_K \in \mathbb{Z}^+, n_1 \geq n_2 \geq \ldots \geq n_K, \sum_{k=1}^{K} n_k = N_t \right\}. \quad \text{formula (1)}$$

The formula (1) can be written as: $\mathcal{N}_{N_t}K=(n_1, n_2, \ldots, n_K)$. The formula (1) indicates explicitly that $N_t$ transmitter antennas shall be classified into K groups as uniform as possible. The classification shall be as uniform as possible means that, if $N_t$ is an integral multiple of K, the numbers of transmitter antennas in each group shall be the same; if $N_t$ is not an integral multiple of K, the difference between the numbers of transmitter antennas in each group can be made as small as possible when the transmitter antennas are grouped.

In step 2. a predetermined number of information symbols are classified into K' groups, and a Toeplitz matrix is constructed for information symbols in each group according to the number of transmitter antennas in a transmitter antenna group. For example, each Toeplitz matrix constructed in this step has $n_k$ columns or $n_k$ rows, where $n_k$ is the number of transmitter antennas contained in the $k^{th}$ transmitter antenna, and the value range of k may be from 1 to K. The value of the K' in this step may be the same as that of K, or may be different from that of K.

This step involves a Toeplitz matrix, and a specific example for the Toeplitz matrix is as follows.

The Toeplitz matrix is a r×l matrix T(v,r,l) for a nonzero vector $V=[v_1, v_2, \ldots, v_p]^T$ with a length of p:

$$\mathcal{T}(v, r, l) \triangleq \begin{bmatrix} v_1 & v_2 & \ldots & v_p & 0 & \ldots & \ldots & 0 \\ 0 & v_1 & \ldots & v_{p-1} & v_p & 0 & \ldots & 0 \\ \vdots & \vdots & \ddots & \ddots & \ddots & \ddots & \ddots & 0 \\ 0 & 0 & \ldots & 0 & v_1 & v_2 & \ldots & v_p \end{bmatrix}^T$$

where $r=p+l-1$. and $[v_i, v_2 \ldots v_p]^T$ represents information symbol vectors.

A specific example for implementing step 2 is as follows.

L information symbols are classified into K' groups uniformly; if L is an integral multiple of K', each group includes L/K' information symbols; and if L is not an integral multiple of K', a certain number of zero symbols are added to the L information symbols, so that a sum of the L and the number of the added zero symbols is an integral multiple of K'. The zero symbols may be added at the end of the original information symbols.

It should be noted that, in the case of adding zero symbols to the original information symbols, the value of L may be adjusted as a sum of the number of the original information symbols and the number of the added zero symbols, that is, the value of L is the number of information symbols after adding the zero symbols. Certainly, the embodiment of the present invention can also classify information symbols into groups with a principle of minimum difference of the number of the information symbols between the groups. Without loss of generality, it is assumed that L in the following formula is an integral multiple of K'.

The information symbols in the K' groups may be represented as follows:

$$s_i \triangleq [s_{(i-1)L/K'+1}, s_{(i-1)L/K'+2}, \ldots, s_{iL/K'}]^T, i=1,2,\ldots, K'. \quad \text{formula (2)}.$$

The Toeplitz matrix having $n_k$ columns constructed for information symbols in each group may be represented as:

$$S_{r,k}^{(i)} \text{ and } \tilde{S}_{r,k}^{(i)} \text{ where } S_{r,k}^{(i)}=T(s_i,r,n_k), \tilde{S}_{r,k}^{(i)}=T(\tilde{s}_i,r,n_k); \quad \text{formula (3)}.$$

In the formula (3), $r=L/K'+n_1-1, i=1,2,\ldots,K'$, $k=1,2,\ldots,K$, L is the number of the information symbols, $s_i$ is a symbol vector of an information symbol in the $i^{th}$ group, and $\tilde{S}_i$ is a symbol vector obtained after reversing the order of the symbol vector $s_i$.

Since a Toeplitz matrix having $n_k$ rows can be obtained through conversion of the Toeplitz matrix having $n_k$ columns, the Toeplitz matrix having $n_k$ rows is not described in detail herein.

In step 3. the Toeplitz matrixes are taken as corresponding elements in the OSTBC matrix, and in the case that the OSTBC matrix includes a zero element, a zero matrix with a corresponding dimension is taken as the zero element in the OSTBC matrix, so as to obtain a space-time/space-frequency code matrix X(s) according to the embodiment of the present invention. That is to say, in the case that the OSTBC matrix includes a zero element, the Toeplitz matrixes and at least one zero matrix with a corresponding dimension shall be used to construct the space-time/space-frequency code matrix X(s) according to the embodiment of the present invention, where the number of the zero matrix depends on the number of the zero element in the OSTBC matrix; and in the case that the OSTBC matrix does not include any zero element, the Toeplitz matrixes shall be used to construct the space-time/space-frequency code matrix X(s) according to the embodiment of the present invention.

The so-called zero matrix with a corresponding dimension is a zero matrix having the same number of rows as that of a left/right adjacent Toeplitz matrix and having the same number of columns as that of an up/down adjacent Toeplitz matrix.

Since the Toeplitz matrixes are taken as elements in the OSTBC matrix, the Toeplitz matrixes in the embodiment of the present invention may be called element sub matrixes.

An example for constructing the space-time/space-frequency code matrix X(s) according to the embodiment of the present invention is: taking the Toeplitz matrixes as elements in an OSTBC $O_{K',K}$ matrix, and taking the zero matrixes as zero elements in the OSTBC $O_{K',K}$ matrix, so as to obtain the space-time/space-frequency code matrix X(s) according to the embodiment of the present invention.

The specific implementation of the example for constructing the space-time/space-frequency code matrix X(s) according to the embodiment of the present invention is: substituting the $S_{r,k}^{(i)}$ for an information symbol vector $s_i$ in the OSTBC $O_{K',K}$ matrix, substituting the $\tilde{S}_{r,k}^{(i)*}$ ($\tilde{S}_{r,k}^{(i)*}$ represents a matrix obtained by complex conjugation of each element in the $\tilde{S}_{r,k}^{(i)*}$ for an information symbol vector $s_i^*$ in the OSTBC $O_{K',K}$ matrix, and substituting a zero matrix with a corresponding dimension, for a zero element in the OSTBC $O_{K',K}$ matrix, so that the space-time/space-frequency code matrix X(s) obtained finally can be represented as: $X_{NN_t}^K(s)$. In the case of K=3 and K'=3. a specific example for the space-time/space-frequency code matrix X(s) constructed finally is:

$$X_{NN_t,3}(s) = \begin{bmatrix} S_{r,1}^{(1)} & S_{r,2}^{(2)} & S_{r,3}^{(3)} \\ -\tilde{S}_{r,1}^{(2)*} & \tilde{S}_{r,2}^{(1)*} & 0 \\ \tilde{S}_{r,1}^{(3)*} & 0 & -\tilde{S}_{r,3}^{(1)*} \\ 0 & -\tilde{S}_{r,2}^{(3)*} & \tilde{S}_{r,3}^{(2)*} \end{bmatrix};$$

$$\underbrace{\phantom{X}}_{\tilde{s}_1} \quad \underbrace{\phantom{X}}_{\tilde{s}_2} \quad \underbrace{\phantom{X}}_{\tilde{s}_3}$$

where $N_t$ is the number of transmitter antennas, $N_{N_t}^3=(n_1, n_2, n_3)$.

In this step, it should be noted that, the embodiment of the present invention uses an existing OSTBC matrix to construct the space-time/space-frequency code matrix X(s), and the OSTBC matrix is in various forms, for example, $$O_{2,2} = \begin{bmatrix} s_1 & s_2 \\ -s_2^* & s_1^* \end{bmatrix},$$

$$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix},$$

$$O_{3,4} = \begin{bmatrix} s_1 & s_2 & s_3 & 0 \\ -s_2^* & s_1^* & 0 & s_3 \\ s_3^* & 0 & -s_1^* & s_2 \\ 0 & -s_3^* & s_2^* & s_1 \end{bmatrix},$$

and the like. In the $$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix},$$

columns correspond to the transmitter antennas, and rows correspond to time or frequency.

Besides, in some documents, OSTBC matrixes are not expressed in the form of $O_{K',K}$, for example, the OSTBC matrixes recorded in some documents are:

$$X_3^c = \begin{bmatrix} x_1 & -x_2 & -x_3 & -x_4 & x_1^* & -x_2^* & -x_3^* & -x_4^* \\ x_2 & x_1 & x_4 & -x_3 & x_2^* & x_1^* & x_4^* & -x_3^* \\ x_3 & -x_4 & x_1 & x_2 & x_3^* & -x_4^* & x_1^* & x_2^* \end{bmatrix}^T,$$

$$X_4^c = \begin{bmatrix} x_1 & -x_2 & -x_3 & -x_4 & x_1^* & -x_2^* & -x_3^* & -x_4^* \\ x_2 & x_1 & x_4 & -x_3 & x_2^* & x_1^* & x_4^* & -x_3^* \\ x_3 & -x_4 & x_1 & x_2 & x_3^* & -x_4^* & x_1^* & x_2^* \\ x_4 & x_3 & -x_2 & x_1 & x_4^* & x_3^* & -x_2^* & x_1^* \end{bmatrix}^T,$$

$$X_3^h = \begin{bmatrix} x_1 & -x_2^* & \frac{x_3^*}{\sqrt{2}} & \frac{x_3^*}{\sqrt{2}} \\ x_2 & x_1^* & \frac{x_3^*}{\sqrt{2}} & \frac{-x_3^*}{\sqrt{2}} \\ \frac{x_3}{\sqrt{2}} & \frac{x_3}{\sqrt{2}} & \frac{(-x_1-x_1^*+x_2-x_2^*)}{2} & \frac{(x_2+x_2^*+x_1-x_1^*)}{2} \end{bmatrix}^T,$$

$$X_4^h = \begin{bmatrix} x_1 & -x_2 & \frac{x_3^*}{\sqrt{2}} & \frac{x_3^*}{\sqrt{2}} \\ x_2 & x_1 & \frac{x_3^*}{\sqrt{2}} & \frac{-x_3^*}{\sqrt{2}} \\ \frac{x_3}{\sqrt{2}} & \frac{x_3}{\sqrt{2}} & \frac{(-x_1-x_1^*+x_2-x_2^*)}{2} & \frac{(x_2+x_2^*+x_1-x_1^*)}{2} \\ \frac{x_3}{\sqrt{2}} & \frac{-x_3}{\sqrt{2}} & \frac{(-x_2-x_2^*+x_1-x_1^*)}{2} & \frac{-(x_1+x_1^*+x_2-x_2^*)}{2} \end{bmatrix}^T,$$

and $$x_3^{H'} = \begin{bmatrix} x_1 & x_2^* & x_3^* & 0 \\ -x_2 & x_1^* & 0 & -x_3^* \\ -x_3 & 0 & x_1^* & x_2^* \end{bmatrix}^T.$$

It should be noted particularly that, all OSTBC matrixes are all expressed in the form of $O_{K',K}$, for example, $$X_3^c = \begin{bmatrix} x_1 & -x_2 & -x_3 & -x_4 & x_1^* & -x_2^* & -x_3^* & -x_4^* \\ x_2 & x_1 & x_4 & -x_3 & x_2^* & x_1^* & x_4^* & -x_3^* \\ x_3 & -x_4 & x_1 & x_2 & x_3^* & -x_4^* & x_1^* & x_2^* \end{bmatrix}^T$$

may be represented as $O_{4,3}$ (4 represents the value of K', and 3 represents the value of K). That is to say, in the embodiment of the present invention, a space-time/space-frequency code matrix X(s) having orthogonality can be constructed with different OSTBC matrixes.

The method for constructing a space-time/space-frequency code according to the embodiment of the present invention is described below by taking that K=3. K'=3. the number of transmitter antennas $N_t$=6. and the number of information symbols to be transmitted L=6 as an example.

6 transmitter antennas are classified into 3 groups, and each group has 2 transmitter antennas, that is, each group has 2 elements; 6 independent information symbols are: $s=[s_1, s_2, s_3, s_4, s_5, s_6]^T$, the 6 information symbols are classified into 3 groups, and symbol vectors of the information symbols in each group are: $s_1=[s_1, s_2]^T$, $s_2=[s_3, s_4]^T$, and $s_3=[s_5, s_6]^T$. $\tilde{s}_1=[s_2, s_1]^T$, $\tilde{s}_2=[s_4, s_3]^T$, and $\tilde{s}_3=[s_6, s_5]^T$ can be derived from the $S_1$, $S_2$, and $S_3$. Since $r=L/K'+n_1-1$, $r=3$.

Toeplitz matrixes constructed for information symbols in each group are respectively:

$$S_{r,k}^{(1)} = \begin{bmatrix} s_1 & 0 \\ s_2 & s_1 \\ 0 & s_2 \end{bmatrix},$$

$$S_{r,k}^{(2)} = \begin{bmatrix} s_3 & 0 \\ s_4 & s_3 \\ 0 & s_4 \end{bmatrix},$$

$$S_{r,k}^{(3)} = \begin{bmatrix} s_5 & 0 \\ s_6 & s_5 \\ 0 & s_6 \end{bmatrix}.$$

According to $$S_{r,k}^{(1)} = \begin{bmatrix} s_1 & 0 \\ s_2 & s_1 \\ 0 & s_2 \end{bmatrix},$$

$$S_{r,k}^{(2)} = \begin{bmatrix} s_3 & 0 \\ s_4 & s_3 \\ 0 & s_4 \end{bmatrix},$$

$$S_{r,k}^{(3)} = \begin{bmatrix} s_5 & 0 \\ s_6 & s_5 \\ 0 & s_6 \end{bmatrix},$$

$$\tilde{S}_{r,k}^{(1)} = \begin{bmatrix} s_2 & 0 \\ s_1 & s_2 \\ 0 & s_1 \end{bmatrix},$$

$$\tilde{S}_{r,k}^{(2)} = \begin{bmatrix} s_4 & 0 \\ s_3 & s_4 \\ 0 & s_3 \end{bmatrix},$$

$$\tilde{S}_{r,k}^{(3)} = \begin{bmatrix} s_6 & 0 \\ s_5 & s_6 \\ 0 & s_5 \end{bmatrix}$$

can be obtained.

Therefore, a space-time/space-frequency code matrix $X_{NN_t}^{,3}(s)$ constructed by using $$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix}$$

according to $$S_{r,k}^{(1)} = \begin{bmatrix} s_1 & 0 \\ s_2 & s_1 \\ 0 & s_2 \end{bmatrix},$$

$$S_{r,k}^{(2)} = \begin{bmatrix} s_3 & 0 \\ s_4 & s_3 \\ 0 & s_4 \end{bmatrix},$$

$$S_{r,k}^{(3)} = \begin{bmatrix} s_5 & 0 \\ s_6 & s_5 \\ 0 & s_6 \end{bmatrix},$$

$$\tilde{S}_{r,k}^{(1)} = \begin{bmatrix} s_2 & 0 \\ s_1 & s_2 \\ 0 & s_1 \end{bmatrix},$$

$$\tilde{S}_{r,k}^{(2)} = \begin{bmatrix} s_4 & 0 \\ s_3 & s_4 \\ 0 & s_3 \end{bmatrix},$$

$$\tilde{S}_{r,k}^{(3)} = \begin{bmatrix} s_6 & 0 \\ s_5 & s_6 \\ 0 & s_5 \end{bmatrix}$$

and $$\begin{bmatrix} s_1 & 0 & s_3 & 0 & s_5 & 0 \\ s_2 & s_1 & s_4 & s_3 & s_6 & s_5 \\ 0 & s_2 & 0 & s_4 & 0 & s_6 \\ -s_4^* & 0 & s_2^* & 0 & 0 & 0 \\ -s_3^* & -s_4^* & s_1^* & s_2^* & 0 & 0 \\ 0 & -s_3^* & 0 & s_1^* & 0 & 0 \\ s_6^* & 0 & 0 & 0 & -s_2^* & 0 \\ s_5^* & s_6^* & 0 & 0 & -s_1^* & -s_2^* \\ 0 & s_5^* & 0 & 0 & 0 & -s_1^* \\ 0 & 0 & -s_6^* & 0 & s_4^* & 0 \\ 0 & 0 & -s_5^* & -s_6^* & s_3^* & s_4^* \\ 0 & 0 & 0 & -s_5^* & 0 & s_3^* \end{bmatrix}.$$

is:

It should be noted that, the space-time/space-frequency code matrix X(s) illustrated is described by taking a Toeplitz matrix having $n_k$ columns as an example, and a Toeplitz matrix having $n_k$ rows can be obtained through conversion of the space-time/space-frequency code matrix X(s). Therefore, the space-time/space-frequency code matrix X(s) corresponding to a Toeplitz matrix having $n_k$ rows is not described in detail herein.

Figure 2:
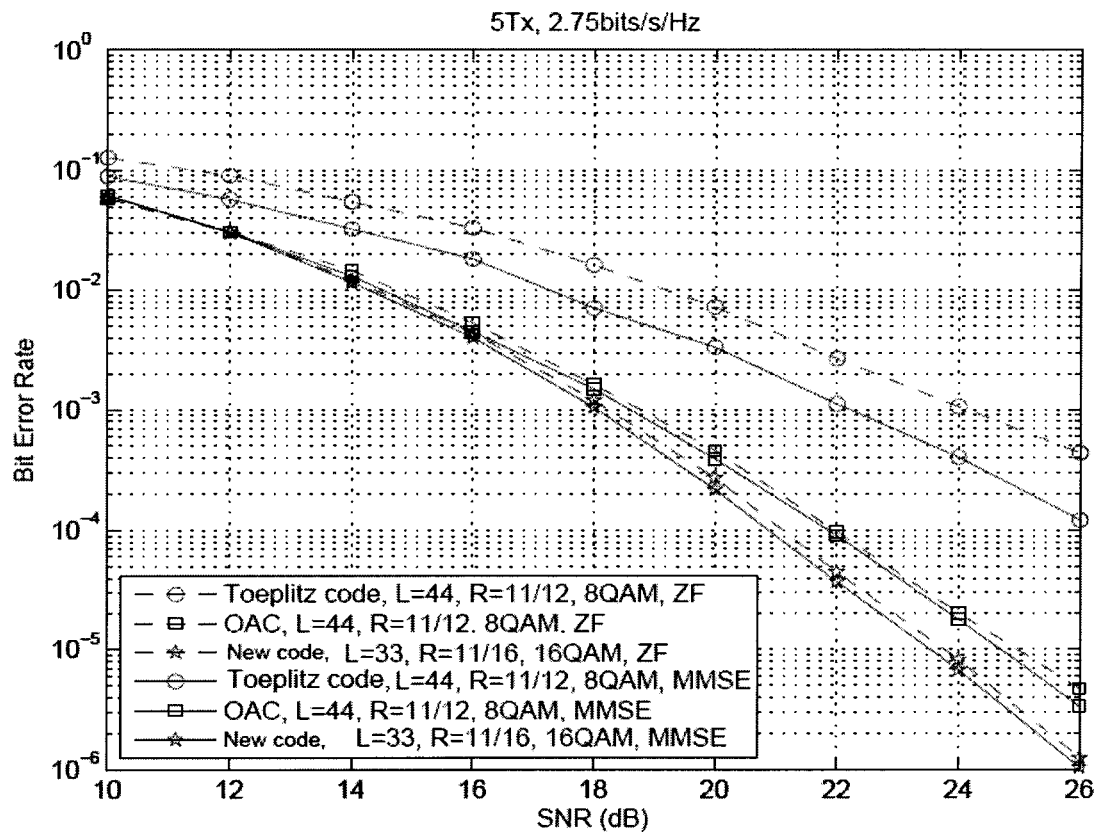
FIG. 2 is a first schematic view of a simulation result according to an embodiment of the present invention.
Figure 3:
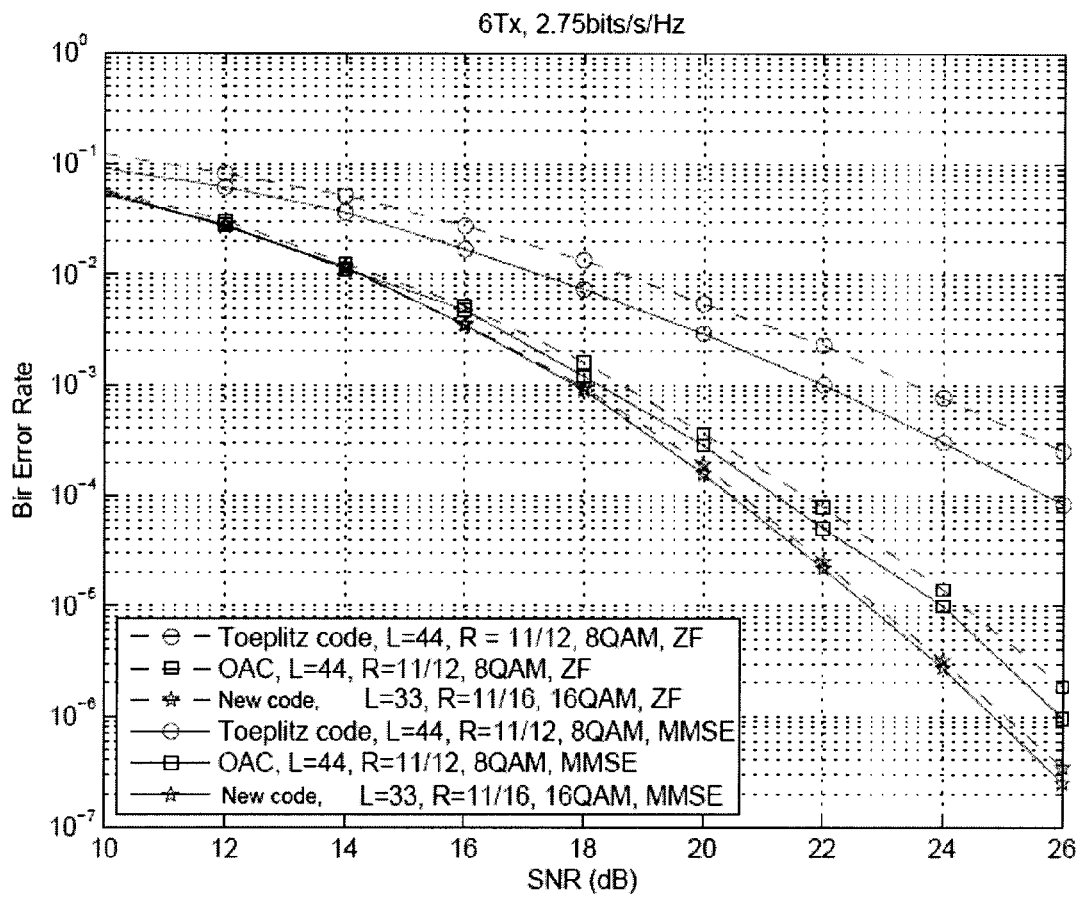
FIG. 3 is a second schematic view of the simulation result according to an embodiment of the present invention.

FIGS. 2 and 3 show simulation results for BERs of OACs, Toeplitz Space-Time codes, and space-time codes according to the embodiment of the present invention.

In the case that the number of transmitter antennas is 5 and the spectrum efficiency (that is, spectrum utilization ratio) is 2.75 bps/Hz, a simulation result for BERs of OACs, Toeplitz Space-Time codes, and space-time codes according to the embodiment of the present invention is as shown in FIG. 2.

In FIG. 2, the horizontal axis represents a signal-to-noise ratio (SNR), and the vertical axis represents a BER; a dotted line with circles represents a BER curve of Toeplitz Space-Time codes in the case of L=44. code rate R=11/12, 8 Quadrature Amplitude Modulation (8 QAM), and a ZF receiver; a solid line with circles represents a BER curve of Toeplitz Space-Time codes in the case of L=44. R=11/12, 8 QAM, and a linear MMSE receiver; a dotted line with blocks represents a BER curve of OACs in the case of L=44. R=11/12, 8 QAM, and a ZF receiver; a solid line with blocks represents a BER curve of OACs in the case of L=44. R=11/12, 8 QAM, and a linear MMSE receiver; a dotted line with pentangles represents a BER curve of the space-time/space-frequency code according to the embodiment of the present invention in the case of L=33. R=11/16, 8 QAM, and a ZF receiver; and a solid line with pentangles represents a BER curve of the space-time/space-frequency code according to the embodiment of the present invention in the case of L=33. R=11/16, 8 QAM, and a linear MMSE receiver.

It can be obviously obtained from 6 curves shown in FIG. 2 that, in the case that the number of transmitter antennas is 5 and the spectrum efficiency is 2.75 bps/Hz, the BER of the space-time/space-frequency code according to the embodiment of the present invention is lower than that of the OACs and Toeplitz Space-Time codes.

In the case that the number of transmitter antennas is 6 and the spectrum efficiency is 2.75 bps/Hz, a simulation result for BERs of OACs, Toeplitz Space-Time codes, and the space-time/space frequency code according to the embodiment of the present invention is as shown in FIG. 3.

In FIG. 3, the horizontal axis represents an SNR, and the vertical axis represents a BER; a dotted line with circles represents a BER curve of Toeplitz Space-Time codes in the case of L=44, code rate R=11/12, 8 QAM, and a ZF receiver; a solid line with circles represents a BER curve of Toeplitz Space-Time codes in the case of L=44. R=11/12, 8 QAM, and a linear MMSE receiver; a dotted line with blocks represents a BER curve of OACs in the case of L=44. R=11/12, 8 QAM, and a ZF receiver; a solid line with blocks represents a BER curve of OACs in the case of L=44, R=11/12, 8 QAM, and a linear MMSE receiver; a dotted line with pentangles represents a BER curve of the space-time/space-frequency code according to the embodiment of the present invention in the case of L=33. R=11/16, 16 QAM, and a ZF receiver; and a solid line with pentangles represents a BER curve of the space-time/space-frequency code according to the embodiment of the present invention in the case of L=33. R=11/16, 16 QAM, and a linear MMSE receiver.

It can be obviously obtained from 6 curves shown in FIG. 3 that, in the case that the number of transmitter antennas is 6 and the spectrum efficiency is 2.75 bps/Hz, the BER of the space-time/space-frequency code according to the embodiment of the present invention is lower than that of the OACs and Toeplitz Space-Time codes.

The simulation results indicate explicitly that, in the case that the number of transmitter antennas is greater than 4. the BER can be meliorated with the space-time/space-frequency code matrix constructed according to the embodiment of the present invention.

Since the increase of the value of K' may increase the orthogonality of an equivalent channel matrix, so as to reduce the interference, the performance may be improved accordingly. However, the increase of the value of K' may cause the increase of the value of K, thereby causing the decrease of the code rate; on the other hand, when the value of K is decreased, the orthogonality of the equivalent channel matrix may be decreased accordingly, thereby increasing interference, the performance may be reduced, but the code rate may be increased accordingly. Therefore, if suitable K and K' are selected, a better compromise between the code rate and performance can be achieved. The simulation results prove that, in the case of K=3. the better compromise between the code rate and performance can be achieved by using the space-time/space-frequency code matrix constructed according to the embodiment of the present invention.

After the space-time/space-frequency code matrix X(s) having the orthogonality according to the embodiment of the present invention is constructed successfully, a transmitting apparatus performs subsequent transmission processing operations based on the space-time/space-frequency code matrix X(s). The transmitting apparatus may implement transmission of information symbols on the basis of the space-time/space-frequency code matrix X(s) with a plurality of existing transmission processing operations, and the specific implementations of the transmission processing operations are not described one by one in detail herein.

In the embodiment of the present invention, a receiving signal may be represented as:

$$Y = \sqrt{\frac{SNR}{N_t}} X(s)H + W. \qquad \text{formula (4)}$$

In formula (4), X(s) is a space-time/space-frequency code matrix adopted by the transmitting apparatus, and is a T×N_t complex matrix; Y is a receiving signal matrix, and is a T×Nr complex matrix; and SNR is a signal-to-noise ratio.

Formula (4) may be changed into a form of an equivalent channel model, that is, it is changed into:

$$y = \sqrt{\frac{SNR}{N_t}} \mathcal{H}s + w. \qquad \text{formula (5)}$$

In formula (5), s is an L-dimensional transmission signal vector, H is a corresponding equivalent channel and is a $TN_r \times L$ complex matrix; y is a $TN_r$-dimensional transmission signal vector; and SNR is a signal-to-noise ratio.

The space-time/space-frequency code equivalent channel matrix in the embodiment of the present invention has orthogonality.

A specific example of performing signal detection with a ZF receiver is that, the ZF receiver can perform signal detection with the following formula (6) for an information symbol $s_i$ in the $i^{th}$ group.

$$\hat{s}_i = \{(H_i^H H_i)^{-1} H_i^H y\} \qquad \text{formula (6).}$$

In formula (6), $H_i$ is an element sub matrix consisting of an equivalent channel matrix and a corresponding column of the information symbol $s_i$ in the $i^{th}$ group.

A transmitting method according to an embodiment of the present invention is described below.

In step 1. L information symbols to be transmitted are obtained.

If the obtained L information symbols are an integral multiple of K', the L information symbols are classified into K' groups uniformly, and each group includes L/K' information symbols; and if the obtained L information symbols are not an integral multiple of K', a certain number of zero symbols are added to the L information symbols, so that a sum of the L and the number of the added zero symbols is an integral multiple of K'. The zero symbols may be added at the end of the information symbols to be transmitted.

In step 2. the obtained information symbols are transmitted according to the space-time/space-frequency code matrix in the embodiment of the present invention.

For example, 6 transmitter antennas are classified into 3 groups, each group has 2 transmitter antennas, the obtained 6 independent information symbols are $[s_1, s_2, s_3, s_4, s_5, s_6]^T$, and in the case that the 6 information symbols are classified into 3 groups, and symbol vectors for information symbols in each group are respectively $s_1 = [s_1, s_2]^T$, $s_2 = [s_3, s_4]^T$, and $s_3 = [s_5, s_6]^T$, the obtained 6 information symbols are transmitted according to the following matrix:

$$\begin{bmatrix} s_1 & 0 & s_3 & 0 & s_5 & 0 \\ s_2 & s_1 & s_4 & s_3 & s_6 & s_5 \\ 0 & s_2 & 0 & s_4 & 0 & s_6 \\ -s_4^* & 0 & s_2^* & 0 & 0 & 0 \\ -s_3^* & -s_4^* & s_1^* & s_2^* & 0 & 0 \\ 0 & -s_3^* & 0 & s_1^* & 0 & 0 \\ s_6^* & 0 & 0 & 0 & -s_2^* & 0 \\ s_5^* & s_6^* & 0 & 0 & -s_1^* & -s_2^* \\ 0 & s_5^* & 0 & 0 & 0 & -s_1^* \\ 0 & 0 & -s_6^* & 0 & s_4^* & 0 \\ 0 & 0 & -s_5^* & -s_6^* & s_3^* & s_4^* \\ 0 & 0 & 0 & -s_5^* & 0 & s_3^* \end{bmatrix}.$$

A correspondence relation exists between the space-time/space-frequency code matrix according to the embodiment of the present invention and $$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix}.$$

The correspondence relation is that, the matrix according to the embodiment of the present invention can be divided into 9 sub matrixes (that is, 9 sub matrixes are included), the 9 sub matrixes include 6 Toeplitz matrixes and 3 zero matrixes with a corresponding dimension, and the 6 Toeplitz matrixes are respectively:

$$S_{r,k}^{(1)} = \begin{bmatrix} s_1 & 0 \\ s_2 & s_1 \\ 0 & s_2 \end{bmatrix},$$

$$S_{r,k}^{(2)} = \begin{bmatrix} s_3 & 0 \\ s_4 & s_3 \\ 0 & s_4 \end{bmatrix},$$

$$S_{r,k}^{(3)} = \begin{bmatrix} s_5 & 0 \\ s_6 & s_5 \\ 0 & s_6 \end{bmatrix},$$

$$\tilde{S}_{r,k}^{(1)} = \begin{bmatrix} s_2 & 0 \\ s_1 & s_2 \\ 0 & s_1 \end{bmatrix},$$

$$\tilde{S}_{r,k}^{(2)} = \begin{bmatrix} s_4 & 0 \\ s_3 & s_4 \\ 0 & s_3 \end{bmatrix},$$

$$\tilde{S}_{r,k}^{(3)} = \begin{bmatrix} s_6 & 0 \\ s_5 & s_6 \\ 0 & s_5 \end{bmatrix}.$$

The 6 Toeplitz matrixes correspond to corresponding elements in $$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix}$$

respectively, and 3 zero matrixes correspond to zero elements in $$O_{3,3} = \begin{bmatrix} s_1 & s_2 & s_3 \\ -s_2^* & s_1^* & 0 \\ s_3^* & 0 & -s_1^* \\ 0 & -s_3^* & s_2^* \end{bmatrix}$$

respectively.

Therefore, a specific example for features of the space-time/space-frequency code matrix adopted by transmitting information symbols according to the embodiment of the present invention is as follows.

The space-time/space-frequency code matrix according to the embodiment of the present invention includes a plurality of sub matrixes (that is, the matrix can be divided into a plurality of sub matrixes), and the plurality of sub matrixes includes a plurality of Toeplitz matrixes and a plurality of zero matrixes. The plurality of Toeplitz matrixes and the plurality of zero matrixes have a one-to-one correspondence relation with elements in an OSTBC matrix, the Toeplitz matrixes have a one-to-one correspondence relation with nonzero elements in the OSTBC matrix, and the zero matrixes have a one-to-one correspondence relation with zero elements in the OSTBC matrix.

The OSTBC matrix is an OSTBC matrix based on K and K', where K is the number of groups into which a plurality of transmitter antennas is classified, and K' is the number of groups into which the information symbols are classified. The plurality of Toeplitz matrixes is constructed according to the number of transmitter antennas in a transmitter antenna group. It should be noted particularly that, the sub matrixes into which the space-time/space-frequency code matrix according to the embodiment of the present invention is divided may not include any zero matrix, that is, in the case that the OSTBC matrix does not include any zero element, the sub matrixes into which the space-time/space-frequency code matrix according to the embodiment of the present invention is divided do not include any zero matrix.

Provided that the number of columns of the Toeplitz matrixes corresponds to the number of transmitter antennas in the transmitter antenna group, the Toeplitz matrixes having $n_k$ columns can be represented as: $S_{r,k}^{(i)}$ and $\tilde{S}_{r,k}^{(i)}$, where $S_{r,k}^{(i)} = T(s_i, r, n_k)$, $\tilde{S}_{r,k}^{(i)} = T(\tilde{s}_i, r, n_k)$, $r = L/K' + n_1 - 1$, $i = 1, 2, \ldots, K'$, $k = 1, 2, \ldots, K$, L is the number of the information symbols, $s_i$ is a symbol vector of an information symbol in the $i^{th}$ group, and $\tilde{S}_i$ is a symbol vector obtained after reversing the order of the symbol vector $s_i$. The $S_{r,k}^{(i)}$ corresponds to an information symbol vector $s_i$ in the OSTBC $O_{K',K}$ matrix, $\tilde{S}_{r,k}^{(i)*}$ corresponds to an information symbol vector $s_i^*$ in the OSTBC $O_{K',K}$ matrix, and $\tilde{S}_{r,k}^{(i)*}$ represents a matrix obtained by complex conjugation of each element in the $\tilde{S}_{r,k}^{(i)*}$. In the case that the OSTBC $O_{K',K}$ matrix includes a zero element, a zero matrix with a corresponding dimension corresponds to the zero element in the OSTBC $O_{K',K}$ matrix.

Transmission of information symbols can be implemented with a plurality of existing transmission processing operations by using the space-time/space-frequency code according to the embodiment of the present invention, which is not described in detail herein.

According to the above description about the embodiments, the use of the space-time/space-frequency code matrix having orthogonality constructed according to the embodiment of the present invention not only can obtain a full diversity in the case of a linear receiver, but also can prove with simulation results that, in the case that the number of transmitter antennas is greater than 4 and the spectrum utilization ratio is the same, the space-time/space-frequency code matrix having orthogonality constructed according to the embodiment of the present invention meliorates the BER effectively with respect to the Toeplitz Space-Time codes and OACs. Besides, a space-time/space-frequency code equivalent channel matrix according to the embodiment of the present invention also has orthogonality, and the orthogonality of the equivalent channel matrix can reduce the decoding complexity from $O(L^3)$ to $O(K'/L/K')^3$, so as to reduce the decoding complexity significantly and achieve a better compromise between the performance and code rate finally.

Through the descriptions of the preceding embodiments, persons skilled in the art may understand that the present invention may be implemented by software and a necessary universal hardware platform or only by hardware. However, in most cases, using software and a necessary universal hardware platform are preferred. Based on this, the technical solutions of the present invention may be embodied in the form of a software product. The computer software product may be stored in a storage medium, such as a ROM/RAM, a magnetic disk, or an optical disk, and contain several instructions to instruct computer equipment (for example, a personal computer, a server, or network equipment) to perform the method described in the embodiments of the present invention or in some parts of the embodiments.

Figure 4:
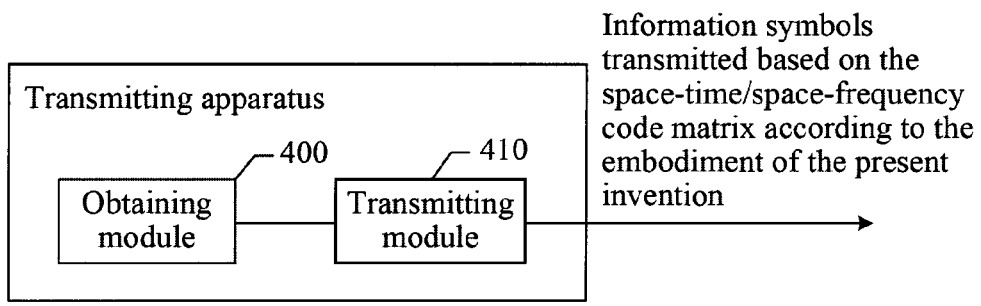
FIG. 4 is a schematic view of a transmitting apparatus according to an embodiment of the present invention.

A transmitting apparatus according to an embodiment of the present invention is described below with reference to FIG. 4. The transmitting apparatus in FIG. 4 includes: an obtaining module 400 and a transmitting module 410.

The obtaining module 400 obtains information symbols to be transmitted. The obtaining module 400 shall obtain information symbols with a predetermined number L. When the obtained information symbols are not an integral multiple of K', the obtaining module 400 shall add zero symbols after the information symbols, so that the total number of the obtained information symbols and the zero symbols is an integral multiple of K', that is, L shall be an integral multiple of K'.

The transmitting module 410 performs transmission processing on the information symbols that are to be transmitted and are obtained by the obtaining module 400. A space-time/space-frequency code matrix adopted by the transmitting module 410 shall have the following features: including a plurality of sub matrixes (that is, the matrix can be divided into a plurality of sub matrixes), the plurality of sub matrixes includes a plurality of Toeplitz matrixes and at least one zero matrix, and the plurality of sub matrixes may not include any zero matrix. The plurality of sub matrixes has a one-to-one correspondence relation with elements in an OSTBC matrix, and the one-to-one correspondence relation may be that, the Toeplitz matrixes have a one-to-one correspondence relation with nonzero elements in the OSTBC matrix, and when the OSTBC matrix includes zero elements, the zero matrixes have a one-to-one correspondence relation with the zero elements in the OSTBC matrix, where the number of the zero matrixes is the same as that of the zero elements. The OSTBC matrix is an OSTBC matrix based on K and K', where K is the number of groups into which a plurality of transmitter antennas is classified, and K' is the number of groups into which the information symbols are classified. The plurality of Toeplitz matrixes is constructed according to the number of transmitter antennas in a transmitter antenna group. Specific features of the space-time/space-frequency code matrix adopted by the transmitting module 410 are as those described in the embodiment of the method, and are not repeated herein.

Figure 5:
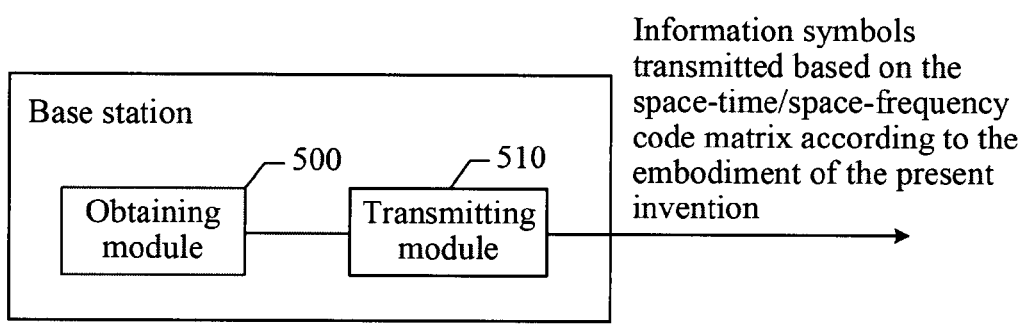
FIG. 5 is a schematic view of a base station according to an embodiment of the present invention.

A base station according to an embodiment of the present invention is described below with reference to FIG. 5. The base station in FIG. 5 includes: an obtaining module 500 and a transmitting module 510. The obtaining module 500 obtains information symbols to be transmitted. The obtaining module 500 shall obtain information symbols with a predetermined number L. When the obtained information symbols are not an integral multiple of K', the obtaining module 500 shall add zero symbols after the information symbols, so that the total number of the obtained information symbols and the zero symbols is an integral multiple of K', that is, L shall be an integral multiple of K'.

The transmitting module 510 performs transmission processing on the information symbols that are to be transmitted and are obtained by the obtaining module 500. A space-time/space-frequency code matrix adopted by the transmitting module 510 shall have the following features: including a plurality of sub matrixes (that is, the matrix can be divided into a plurality of sub matrixes), the plurality of sub matrixes includes a plurality of Toeplitz matrixes and at least one zero matrix, and the plurality of sub matrixes may not include any zero matrix. The plurality of sub matrixes has a one-to-one correspondence relation with elements in an OSTBC matrix, and the one-to-one correspondence relation may be that, the Toeplitz matrixes have a one-to-one correspondence relation with nonzero elements in the OSTBC matrix, and when the OSTBC matrix includes zero elements, the zero matrixes have a one-to-one correspondence relation with the zero elements in the OSTBC matrix, where the number of the zero matrixes is the same as that of the zero elements. The OSTBC matrix is an OSTBC matrix based on K and K', where K is the number of groups into which a plurality of transmitter antennas is classified, and K' is the number of groups into which the information symbols are classified. The plurality of Toeplitz matrixes is constructed according to the number of transmitter antennas in a transmitter antenna group. Specific features of the space-time/space-frequency code matrix adopted by the transmitting module 510 are as those described in the embodiment of the method, and are not repeated herein.

Figure 6:
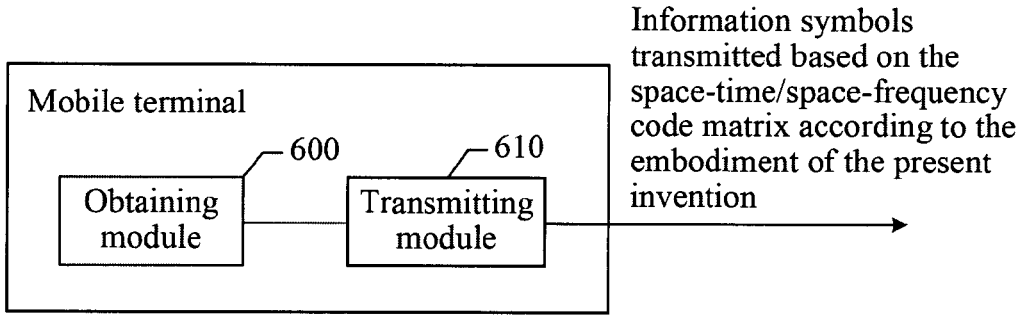
FIG. 6 is a schematic view of a mobile terminal according to an embodiment of the present invention.

A mobile terminal according to an embodiment of the present invention is described below with reference to FIG. 6. The mobile terminal in FIG. 6 includes: an obtaining module 600 and a transmitting module 610.

The obtaining module 600 obtains information symbols to be transmitted. The obtaining module 600 shall obtain information symbols with a predetermined number L. When the obtained information symbols are not an integral multiple of K', the obtaining module 600 shall add zero symbols afte the information symbols, so that the total number of the obtained information symbols and the zero symbols is an integral multiple of K', that is, L shall be an integral multiple of K'.

The transmitting module 610 performs transmission processing on the information symbols that are to be transmitted and are obtained by the obtaining module 600. A space-time/space-frequency code matrix adopted by the transmitting module 610 shall have the following features: including a plurality of sub matrixes (that is, the matrix can be divided into a plurality of sub matrixes), the plurality of sub matrixes includes a plurality of Toeplitz matrixes and at least one zero matrix, and the plurality of sub matrixes may not include any zero matrix. The plurality of sub matrixes has a one-to-one correspondence relation with elements in an OSTBC matrix, and the one-to-one correspondence relation may be that, the Toeplitz matrixes have a one-to-one correspondence relation with nonzero elements in the OSTBC matrix, and when the OSTBC matrix includes zero elements, the zero matrixes have a one-to-one correspondence relation with the zero elements in the OSTBC matrix, where the number of the zero matrixes is the same as that of the zero elements. The OSTBC matrix is an OSTBC matrix based on K and K', where K is the number of groups into which a plurality of transmitter antennas is classified, and K' is the number of groups into which the information symbols are classified. The plurality of Toeplitz matrixes is constructed according to the number of transmitter antennas in a transmitter antenna group. Specific features of the space-time/space-frequency code matrix adopted by the transmitting module 610 are as those described in the embodiment of the method, and are not repeated herein.

Although the present invention is illustrated with embodiments, persons skilled in the art know that, various modification and variations without departing from the spirit of the present invention shall fall with the scope of the claims of the application documents of the present invention.

What is claimed is:

1. A transmitting method based on a space-time/space-frequency code, comprising:
    obtaining information symbols to be transmitted;
    transmitting the information symbols according to the space-time/space-frequency code matrix;
    wherein the space-time/space-frequency code matrix is capable of being divided into at least two sub matrixes, the at least two sub matrixes comprises one of the group consisting of: (a) at least two Toeplitz matrixes, and (b) the Toeplitz matrixes and at least one zero matrix, wherein the Toeplitz matrixes correspond to nonzero elements in a given Orthogonal Space-Time Block Coding (OSTBC) matrix respectively, and when the OSTBC matrix comprises a zero element, the zero matrix is corresponding to the zero element in the OSTBC matrix;
    wherein the given OSTBC matrix is an OSTBC matrix based on K and K', K is a number of groups into which at least two transmitter antennas are classified, and K' is a number of groups into which the information symbols are classified; and
    the Toeplitz matrixes are constructed according to a number of transmitter antennas in a transmitter antenna group.

2. The method according to claim 1, wherein
    a Toeplitz matrix $S_{r,k}^{(i)}$ corresponds to an information symbol $s_i$ in an OSTBC $O_{K',K}$ matrix, and a Toeplitz matrix $\tilde{S}_{r,k}^{(i)*}$ corresponds to an information symbol $s_i^*$ in the OSTBC $O_{K',K}$ matrix; and
    the $S_{r,k}^{(i)} = T(s_i, r, n_k)$ and $\tilde{S}_{r,k}^{(i)} = T(\tilde{s}_i, r, n_k)$, $\tilde{S}_{r,k}^{(i)*}$ represents a matrix obtained by complex conjugation of each element in the $\tilde{S}_{r,k}^{(i)*}$;
    wherein $r = L/K' + n_1 - 1, i = 1, 2, \ldots, K', k = 1, 2, \ldots, K$, L is the number of the information symbols, $s_i$ is a symbol vector of an information symbol in the $i^{th}$ group, and $\tilde{S}_i$ is a symbol vector obtained after reversing the order of the symbol vector $s_i$.

3. The method according to claim 1, wherein
    when the number of the information symbols to be transmitted is an integral multiple of K', the information symbols to be transmitted are classified into K' groups uniformly; and
    when the number of the information symbols to be transmitted is not an integral multiple of K', zero symbols are added to the information symbols to be transmitted so that the number of the information symbols after adding the zero symbols is an integral multiple of K', and the information symbols after adding the zero symbols are classified into K' groups uniformly.

4. A transmitting apparatus, comprising a processor and a non-transitory computer readable storage medium, comprising computer program code which, when executed by the processor, causes the processor to execute the following steps:
    obtaining information symbols to be transmitted; and
    transmitting, according to a space-time/space-frequency code matrix, the information symbols that are to be transmitted and are obtained by the obtaining module,
    wherein the space-time/space-frequency code matrix is capable of being divided into at least two sub matrixes, the at least two sub matrixes comprises one of the group consisting of: (a) at least two Toeplitz matrixes, and (b) the Toeplitz matrixes and at least one zero matrix, wherein the Toeplitz matrixes corresponds to nonzero elements in a given Orthogonal Space-Time Block Coding (OSTBC) matrix respectively, and when the OSTBC matrix comprises a zero element, the zero matrix is corresponding to the zero element in the OSTBC matrix;

wherein the given OSTBC matrix is an OSTBC matrix based on K and K', K is a number of groups into which at least two transmitter antennas are classified, and K' is a number of groups into which the information symbols are classified; and the Toeplitz matrixes are constructed according to a number of transmitter antennas in a transmitter antenna group.

5. The transmitting apparatus according to claim 4, wherein:

a Toeplitz matrix $S_{r,k}^{(i)}$ corresponds to an information symbol $s_i$ in an OSTBC $O_{K',K}$ matrix, and a Toeplitz matrix $\tilde{S}_{r,k}^{(i)*}$ corresponds to an information symbol $s_i^*$ in the OSTBC $O_{K',K}$ matrix; and the $S_{r,k}^{(i)} = T(s_i, r, n_k)$ and $\tilde{S}_{r,k}^{(i)} = T(\tilde{s}_i, r, n_k)$, $\tilde{S}_{r,k}^{(i)*}$ represents a matrix obtained by complex conjugation of each element in the $\tilde{S}_{r,k}^{(i)}$;

wherein $r = L/K' + n_1 - 1$, $i = 1, 2, \ldots, K'$, $k = 1, 2, \ldots, K$, L is the number of the information symbols, $s_i$ is a symbol vector of an information symbol in the $i^{th}$ group, and $\tilde{s}_i$ is a symbol vector obtained after reversing the order of the symbol vector $s_i$.

6. The transmitting apparatus according to claim 4, wherein, the transmitting apparatus is a base station or a mobile terminal.

\* \* \* \* \*

UNITED STATES PATENT AND TRADEMARK OFFICE
CERTIFICATE OF CORRECTION

PATENT NO. : 8,675,471 B2  Page 1 of 3
APPLICATION NO. : 13/096774
DATED : March 18, 2014
INVENTOR(S) : Xia et al.

It is certified that error appears in the above-identified patent and that said Letters Patent is hereby corrected as shown below:

In the Specification:

Column 5, Line 4, " $S_{r,k}{}^{(i)}$ and " should read -- $S_{r,k}^{(i)}$ and --.

Column 5, Line 4, " $\check{S}_{r,k}{}^{(i)}$ where " should read -- $\tilde{S}_{r,k}^{(i)}$ where --.

Column 5, Line 4, " $S_{r,k}{}^{(i)}=$ " should read -- $S_{r,k}^{(i)} =$ --.

Column 5, Line 4, " $\tilde{S}_{r,k}{}^{(i)}=$ " should read -- $\tilde{S}_{r,k}^{(i)} =$ --.

Column 5, Line 57, " the $S_{r,k}{}^{(i)}$ for " should read -- the $S_{r,k}^{(i)}$ for --.

Column 5, Line 58, " the $\tilde{S}_{r,k}{}^{(i)*}$ " should read -- the $\tilde{S}_{r,k}^{(i)*}$ --.

Column 5, Line 58, " $(\tilde{S}_{r,k}{}^{(i)*}$ represents " should read -- $(\tilde{S}_{r,k}^{(i)*}$ represents --.

Column 5, Line 60, " the $\tilde{S}_{r,k}{}^{(i)*}$ for " should read -- the $\tilde{S}_{r,k}^{(i)*}$ for --.

Column 13, Line 32, " as: $S_{r,k}{}^{(i)}$ " should read -- as: $S_{r,k}^{(i)}$ --.

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,675,471 B2

*Column 13, Line 32,* " and $\tilde{S}_{r,k}^{(i)}$ " *should read* -- and $\tilde{S}_{r,k}^{(i)}$ --.

*Column 13, Line 33,* " $S_{r,k}^{(i)}=$ " *should read* -- $S_{r,k}^{(i)}=$ --.

*Column 13, Line 33,* " $\tilde{S}_{r,k}^{(i)}=$ " *should read* -- $\tilde{S}_{r,k}^{(i)}=$ --.

*Column 13, Line 37,* " The $S_{r,k}^{(i)}$ corresponds " *should read* -- The $S_{r,k}^{(i)}$ corresponds --.

*Column 13, Line 38,* " matrix, $\tilde{S}_{r,k}^{(i)*}$ " *should read* -- matrix, $\tilde{S}_{r,k}^{(i)*}$ --.

*Column 13, Line 40,* " $\tilde{S}_{r,k}^{(i)*}$ represents " *should read* -- $\tilde{S}_{r,k}^{(i)*}$ represents --.

*Column 13, Line 41,* " in the $\tilde{S}_{r,k}^{(i)*}$. " *should read* -- in the $\tilde{S}_{r,k}^{(i)*}$. --.

In the Claims:

*Column 16, Claim 2, Line 28,* " matrix $S_{r,k}^{(i)}$ " *should read* -- matrix $S_{r,k}^{(i)}$ --.

*Column 16, Claim 2, Line 32,* " the $S_{r,k}^{(i)}=$ " *should read* -- the $S_{r,k}^{(i)}=$ --.

*Column 16, Claim 2, Line 32,* " and $\tilde{S}_{r,k}^{(i)}=$ " *should read* -- and $\tilde{S}_{r,k}^{(i)}=$ --.

*Column 16, Claim 2, Line 32,* " $\tilde{S}_{r,k}^{(i)*}$ represents " *should read* -- $\tilde{S}_{r,k}^{(i)*}$ represents --.

*Column 16, Claim 2, Line 34,* " the $\tilde{S}_{r,k}^{(i)*}$ " *should read* -- the $\tilde{S}_{r,k}^{(i)*}$ --.

*Column 17, Claim 5, Line 14,* " matrix $S_{r,k}^{(i)}$ " *should read* -- matrix $S_{r,k}^{(i)}$ --.

CERTIFICATE OF CORRECTION (continued)
U.S. Pat. No. 8,675,471 B2

*Column 17, Claim 5, Line 16,* " $\tilde{S}_{r,k}^{(i)*}$ corresponds " *should read* -- $\tilde{S}_{r,k}^{(i)*}$ corresponds --.

*Column 17, Claim 5, Line 18,* " the $S_{r,k}^{(i)}$ " *should read* -- the $S_{r,k}^{(i)}$ --.

*Column 17, Claim 5, Line 18,* " and $\tilde{S}_{r,k}^{(i)}$ " *should read* -- and $\tilde{S}_{r,k}^{(i)}$ --.

*Column 17, Claim 5, Line 18,* " $\tilde{S}_{r,k}^{(i)*}$ represents " *should read* -- $\tilde{S}_{r,k}^{(i)*}$ represents --.